(12) United States Patent
Kumar et al.

(10) Patent No.: US 11,761,977 B1
(45) Date of Patent: Sep. 19, 2023

(54) MEMS DESIGN WITH SHEAR FORCE REJECTION FOR REDUCED OFFSET

(71) Applicant: InvenSense, Inc., San Jose, CA (US)

(72) Inventors: Varun Subramaniam Kumar, San Jose, CA (US); Mrigank Sharma, Milpitas, CA (US); Giacomo Laghi, Los Gatos, CA (US); Luca Coronato, Corsico (IT); Matthew Julian Thompson, Beaverton, OR (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 17/733,495

(22) Filed: Apr. 29, 2022

(51) Int. Cl.
*G01P 15/125* (2006.01)
*G01P 15/08* (2006.01)

(52) U.S. Cl.
CPC .... *G01P 15/125* (2013.01); *G01P 2015/0862* (2013.01)

(58) Field of Classification Search
CPC ........... G01P 15/125; G01P 2015/0848; G01P 2015/0837; G01P 2015/0862
USPC ...................................................... 73/514.32
See application file for complete search history.

(56) References Cited

U.S. PATENT DOCUMENTS

| | | | |
|---|---|---|---|
| 8,322,213 B2 | 12/2012 | Trusov et al. | |
| 10,551,191 B2 | 2/2020 | Laghi et al. | |
| 10,571,268 B2 | 2/2020 | Thompson et al. | |
| 2014/0137670 A1* | 5/2014 | Hata | G01L 1/148 73/862.621 |
| 2015/0260752 A1* | 9/2015 | Kishimoto | G01P 15/18 73/514.32 |
| 2017/0184628 A1* | 6/2017 | Hsu | B81B 3/0072 |
| 2018/0245920 A1 | 8/2018 | Laghi et al. | |

FOREIGN PATENT DOCUMENTS

| | | |
|---|---|---|
| CN | 104359547 A | 2/2015 |
| CN | 112596533 A | 4/2021 |

* cited by examiner

*Primary Examiner* — Walter L Lindsay, Jr.
*Assistant Examiner* — Philip T Fadul
(74) *Attorney, Agent, or Firm* — Van Hoven PC; Joshua Van Hoven (57) ABSTRACT

A MEMS sensor includes a central anchoring region that maintains the relative position of an attached proof mass relative to sense electrodes in the presence of undesired forces and stresses. The central anchoring region includes one or more first anchors that rigidly couple to a cover substrate and a base substrate. One or more second anchors are rigidly coupled to only the cover substrate and are connected to the one or more first anchors within the MEMS layer via an isolation spring. The proof mass in turn is connected to the one or more second anchors via one or more compliant springs.

30 Claims, 7 Drawing Sheets

MEMS DESIGN WITH SHEAR FORCE REJECTION FOR REDUCED OFFSET

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

MEMS sensors may be fabricated using semiconductor manufacturing techniques. A MEMS sensor may include movable proof masses that can respond to forces such as linear acceleration (e.g., for MEMS accelerometers), angular velocity (e.g., for MEMS gyroscopes), pressure, and magnetic field. The operation of these forces on the movable proof masses may be measured based on the movement of the proof masses in response to the forces. In some implementations, this movement is measured based on distance between the movable proof masses and fixed electrodes, which form capacitors for sensing the movement.

The MEMS sensor may include multiple layers that are manufactured to collectively form the sensor cavity and components, such as a MEMS layer, cap substrate layer, and base substrate layer. These layers typically have parallel surfaces with respect to each other. The movable proof masses may be located in the MEMS layer. When fixed electrodes are also located within the MEMS layer, movement of the movable poof masses within the MEMS layer (in-plane movement) relative to the fixed electrodes may be used to measure a force along a plane of the MEMS layer. When fixed electrodes are located on another layer, movement of the movable poof masses outside the plane of the MEMS layer (out-of-plane movement) relative to the fixed electrodes may be used to measure a force out of the plane of the MEMS layer (e.g., perpendicular to the MEMS layer). The MEMS sensors may be designed based on expected relative locations of the movable proof masses and the fixed electrodes, both in the absence of a force of interest and in response to forces of interest. If a particular MEMS sensor departs from those expected relative locations due to factors such as manufacturing tolerances, wear, or applied forces, the measurement of the desired force by the sensor may be inaccurate.

SUMMARY

In an embodiment of the present disclosure, a microelectromechanical system (MEMS) sensor may comprise a base substrate, a cover substrate, and a suspended spring-mass system located in a MEMS layer. The MEMS layer may comprise a first portion, where the first portion is coupled to the cover substrate, a second portion, where the second portion is coupled to the cover substrate and the base substrate, and a third portion comprising a proof mass configured to move in a first direction in response to an undesired force. The MEMS layer may further comprise a first spring connecting the first portion to the second portion, a second spring connecting the first portion to the third portion, and a sensing element configured to output a sense signal in response to the motion of the third portion in the first direction. The first, second, and third portions move in response to a shear force applied to the MEMS sensor in a second direction, where the sense signal generated by the sensing element in response to a movement of the proof mass in the first direction remains unchanged when the shear force causes the movement in the second direction.

In an embodiment of the present disclosure, a MEMS sensor may comprise a base substrate, a cover substrate, and an anchoring region. The anchoring region may comprise a first portion, where the first portion is rigidly coupled to the cover substrate, and a second portion, where the second portion is rigidly coupled to the cover substrate and the base substrate. The anchoring region may further comprise a first spring connecting the first portion to the second portion as well as a second spring. The MEMS sensor may further comprise a proof mass region, which substantially surrounds the anchoring region, that connects to the first portion via the second spring.

In an embodiment of the present disclosure, a MEMS sensor may comprise a base substrate, a cover substrate, and an anchoring region within a MEMS layer. The anchoring region may comprise a first portion, where the first portion is rigidly coupled to the cover substrate, and a second portion, where the second portion is rigidly coupled to the cover substrate and the base substrate. The anchoring region may further comprise a first spring connecting the first portion to the second portion and a second spring connecting the first portion to a proof mass.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

A MEMS sensor is designed with an anchoring region within the MEMS plane that prevents undesirable forces imparted on the sensor from causing a proof mass that is suspended from the anchoring system to move with respect to underlying sense electrodes on a base substrate. Despite the presence of such an undesired force, the proof mass moves in a corresponding manner with the underlying base substrate without tilting out of plane, thus maintaining its z-axis distance and x-y plane overlap with respect to the underlying sense electrodes.

The anchoring region includes two distinct anchoring portions. One of the anchoring portions is rigidly coupled to both the cover substrate and base substrate, and thus responds to undesired forces (e.g., bending, compression, packaging shear, etc.) based on the respective movements of both the cover substate and base substrate, resulting in effects such as twisting and tilting of the anchoring region within the MEMS plane. Another anchoring portion is connected to this dual-anchored portion via isolation springs, which are configured and designed to limit the transfer of such forces and movement via the isolation springs. This other anchoring portion is also rigidly coupled only to the cover substate, causing the single-anchored anchoring portion to tend to remain within the MEMS plane despite any forces that are transferred via the isolation springs. The proof mass is suspended from the single-anchored anchoring portion such that it too retains its z-axis position while moving within the x-y plane along with the single-anchored anchoring portion. The spring connecting the proof mass to the single-anchored anchoring portion may be a compliant spring that provides protection to the proof mass against stresses. The compliant spring may prevent the stresses transmitted to the proof mass from exceeding a threshold (e.g., corresponding to the Young's modulus of the material of the proof mass, thus preventing.

The anchoring region may be a circular region that is symmetric about both central x-and-y axes. Within the MEMS plane, the single-anchored anchoring portion may form a pattern such as a floral pattern within the circular region, with extensions of the floral pattern partially surrounding each of two dual-anchored anchoring portions and also the springs that connect to the proof mass. The isolation springs may extend outwardly from the dual-anchored anchoring portions to partially encircle the single-anchored anchoring portion. The compliant springs may substantially extend to within a central region of the single-anchored anchoring portion and outward to a surrounding proof mass, which surrounds the entire anchoring region.

Figure 1:
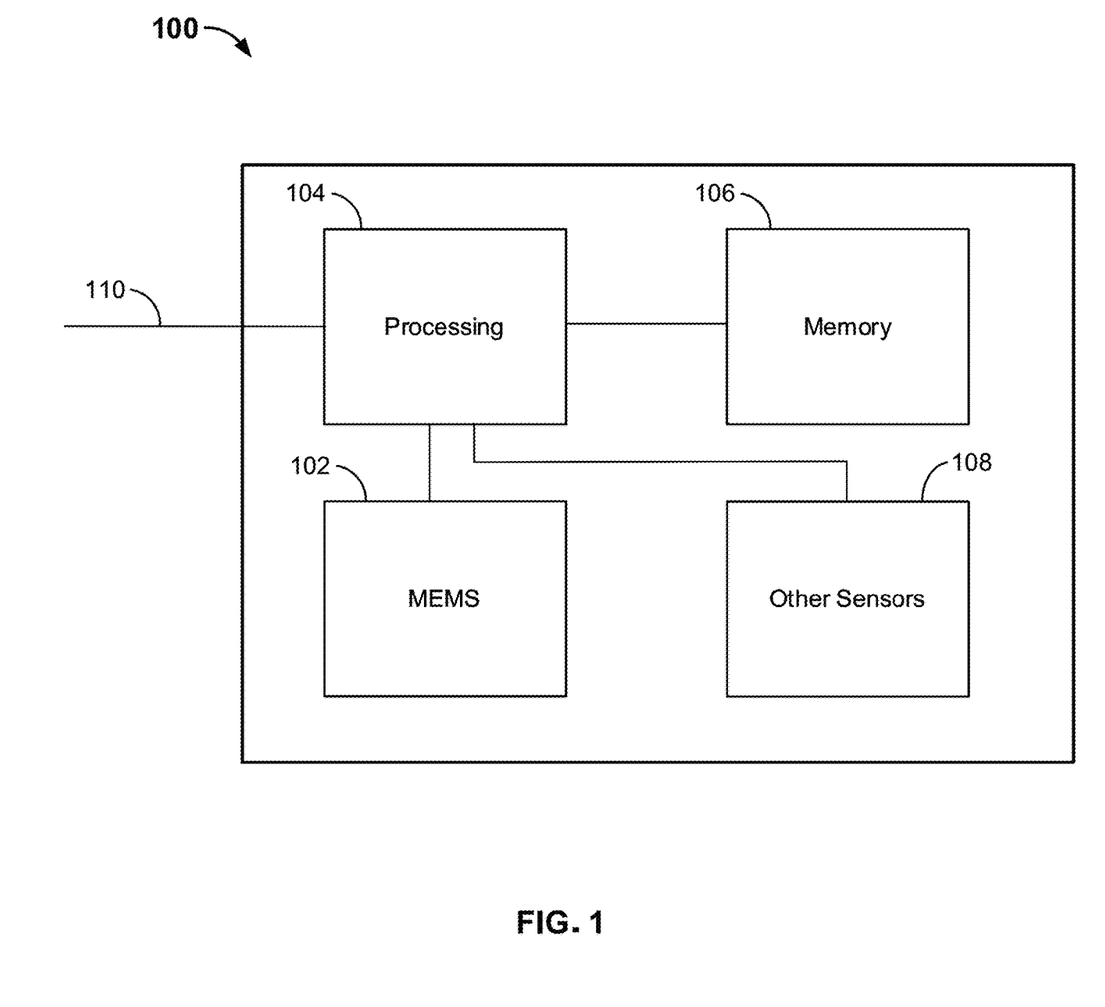
FIG. 1 shows an illustrative MEMS system, in accordance with an embodiment of the present disclosure.

FIG. 1 shows an illustrative MEMS system, in accordance with an embodiment of the present disclosure. Although particular components are depicted in FIG. 1, it will be understood that other suitable combinations of MEMS, processing components, memory, and other circuitry may be utilized as necessary for different applications and systems. In certain embodiments of the present disclosure, the circuitry, devices, systems, and methods described herein may be described in the context of a system including an anchoring region including a first portion which is rigidly coupled to a cover (e.g., upper) substrate and electrically connected to a second portion, via a first (e.g., compliant) spring, while the second portion is rigidly coupled to both the cover substrate and the base substrate and electrically connected, via the anchoring (e.g., electrically anchored), to the base substrate. The first portion is connected to the second portion via an isolation spring, which mechanically isolates the first portion from the second portion such that movements imparted on the second portion (e.g., shear forces, compressive forces, etc.) are not imparted on the first portion, which moves in unison with the cover substrate relative to the base substrate. One or more proof masses of the MEMS sensor are coupled to the first portion by one or more additional springs (e.g. compliant springs) and moves in accordance with the movement of the first portion, thus maintaining its designed position with respect to the base substrate and associated electrodes located thereon. However, it will be understood that the circuitry, devices, systems, and methods described herein may be applied to other types of MEMS sensors.

Processing circuitry 104 may include one or more components providing necessary processing based on the requirements of the MEMS system 100. In some embodiments, processing circuitry 104 may include hardware control logic that may be integrated within a chip of a sensor (e.g., on a base substrate or cover substrate of a MEMS sensor 102 or other sensor 108, or on an adjacent portion of a chip to the MEMS sensor 102 or other sensor 108) to control the operation of the MEMS sensor 102 or other sensors 108. In some embodiments, the MEMS sensor 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS sensor 102 by interacting with the hardware control logic and processing signals received from MEMS sensor 102. The microprocessor may interact with other sensors in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS sensor 102 or other sensors 108 may communicate directly with external circuitry (e.g., via a serial bus or direct connection to sensor outputs and control inputs), in an embodiment the processing circuitry 104 may process data received from the MEMS sensor 102 and other sensors 108 and communicate with external components via a communication interface 110 (e.g., a SPI or I2C bus, in automotive applications a controller area network (CAN) or Local Interconnect Network (LIN) bus, or in other applications suitably wired or wireless communications interfaces as is known in the art). The processing circuitry 104 may convert signals received from the MEMS sensor 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS sensor 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimentsional cameras, industrial automation, and numerous other applications.

In accordance with the present disclosure, a first portion is rigidly coupled to only the cover substrate and is not electrically coupled to either the cover substrate or the base substrate, while a second portion is rigidly coupled to both the cover substrate and the base substrate and electrically coupled to one or both of the cover substrate and the base substrate. The first portion and second portion are connected via one or more isolation springs, and a proof mass is connected to the first anchoring region via additional (e.g., compliant) springs. With respect to the second portion, the proof mass is connected indirectly via the compliant spring, first anchoring region, and the isolation spring(s). Based on its direct anchoring to both the cover substrate and base substrate, the second portion may respond to undesired forces applied to the MEMS sensor, such as by shifting, tilting, or deforming. Based on the isolation spring and the fact that the first portion is essentially "floating" with respect to the base substrate and shifts based on movement of the cover substrate, such forces are only translated to the first portion in a manner similar to movement of the underlying base substrate. As a result, the proof mass will move in a similar manner to the base substrate (e.g., including sense electrodes) such that the position of the proof mass with respect to the base substrate remains consistent despite the presence of shear forces.

The first portion and the second portion collectively form an interior anchoring region and may have a variety of shapes, such as forming a circular anchoring region. The components that are suspended from the second anchoring region (e.g., including the proof mass) via the compliant springs may substantially surround the interior anchoring region. The interior anchoring region and proof mass may be designed and configured to be symmetric about both an x-axis symmetry line and a y-axis symmetry line. In some embodiments, these components may not be symmetric about one or both of the x-axis and y-axis symmetry lines, for example, based on one or more sense springs connecting the proof mass to one or more components of the anchoring region (e.g., the first and/or second anchoring portion).

Figure 2A:
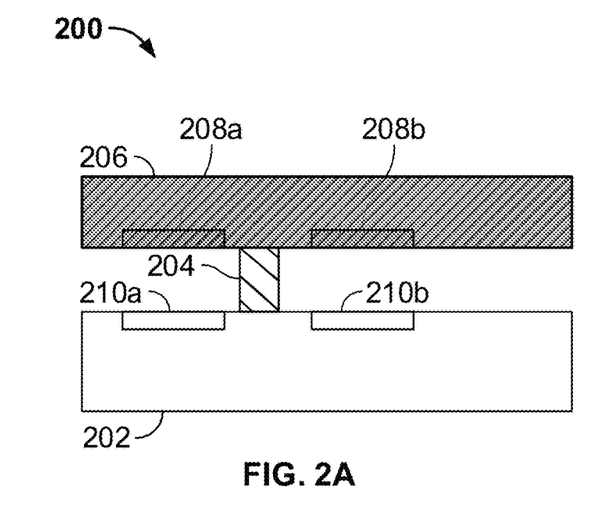
FIG. 2A shows an illustrative MEMS system in the absence of external forces, in accordance with an embodiment of the present disclosure.

FIG. 2A shows an illustrative MEMS system in the absence of external stresses, in accordance with an embodiment of the present disclosure. In the depicted embodiment, the system depicted in FIG. 2A includes base substrate 202, anchor 204, proof mass 206, and sense electrodes 208a, 208b, 210a, and 210b. A cover substrate is not depicted, but in an embodiment, may also be rigidly coupled to the to a portion of a suspended spring-mass system including a proof mass 206. In some embodiments, the system depicted in FIG. 2A may include any suitable number and types of substrates, anchors, or electrodes in any suitable orientation. For example, in some embodiments, two anchors may couple base substrate 202 (e.g., a CMOS substrate) to proof mass 206, where three sense electrodes evenly spread along the bottom surface of proof mass 206 align with three sense electrodes evenly spread along the top surface of base substrate 202. Although particular components are depicted in certain configurations for the system depicted in FIG. 2A, it will be understood that components may be removed, modified, or substituted and that additional components (e.g., springs, electrodes, anchors, processing circuitry, etc.) may be added in certain embodiments.

Base substrate 202 (e.g., a CMOS or signal path substrate) supports sense electrodes 210a, 210b, which are embedded in or lie directly on the top surface of base substrate 202 facing proof mass electrodes 208a, 208b, which, in some embodiments, may be a portion of proof mass 206. Any suitable number of sense electrodes may be located in any suitable positions on base substrate 202 and proof mass 206, so long as the respective electrodes are appropriately located to form capacitors that change in capacitance with movement of the proof mass 206. It will be understood that base substrate 202 may couple to processing circuitry (e.g., within the base substrate 202 or via signal paths through the base substrate 202 to external processing circuitry). Sense electrodes 208a, 208b, which are positioned on the bottom surface of proof mass 206 opposite from sense electrodes 210a, 210b, capacitively engage with sense electrodes 210a, 210b, are positioned on the top surface of base substrate 202 opposite from sense electrodes 208a, 208b. In the absence of an undesired force causing an undesired movement or deformation of one of the base substrate 202 or proof mass 206, the respective electrodes 208a/210a and 208b/210b maintain their respective position with respect to each other (e.g., z-axis separation and x-y plane overlap), and thus maintain a base capacitance, until an expected excitation to be sensed (e.g., linear acceleration, Coriolis force, etc.) causes movement of the proof mass 206 (including electrode 208a and 208b) with respect to the fixed base substrate 202 (including electrodes 210a and 210b).

Figure 2B:
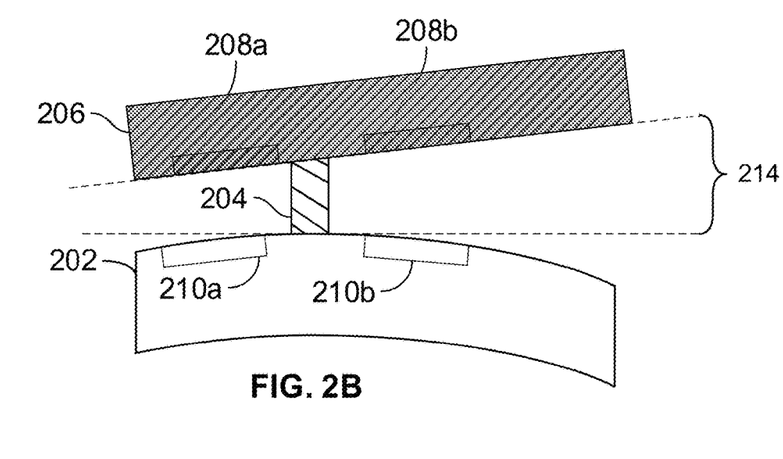
FIG. 2B shows an illustrative MEMS system in response to external forces, in accordance with some embodiments of the present disclosure.

In some embodiments, undesired forces (e.g., bending, shear, tilting, etc.) may be applied to the MEMS sensor that cause the base substrate 202 and/or proof mass 206 to shift or deform. FIG. 2B shows an illustrative MEMS system in response to external stresses, in accordance with some embodiments of the present disclosure. In the depicted embodiment, the system depicted in FIG. 2B includes base substrate 202, anchor 204, proof mass 206, and sense electrodes 208a, 208b, 210a, and 210b of FIG. 2A.

The system depicted in FIG. 2B experiences package deformation in response to an undesired force (e.g., bending, tilting, etc.), which causes base substrate 202 to curve and proof mass 206 to tilt. As a result of the undesired force, respective sense electrodes 208a/210a and 208b/210b fail to maintain their respective position with respect to each other (e.g., z-axis separation and x-y plane overlap) and generate capacitance variation (e.g., sense electrodes 208a/210a move closer together and generate an increased capacitance, while sense electrodes 208b/210b move farther away and generate a decreased capacitance). The deformation of base substrate 202 and tilt proof mass 206 can otherwise be referred to as residual linear offset 214, which results in a MEMS sensor output without an input stimulus. Due to the capacitance variation between sense electrodes 208a/210a and 208b/210b, the MEMS sensor generates a significant offset (e.g., an output signal based on varied capacitance) without regard to the application of the force of interest (e.g., linear acceleration, angular velocity, etc.), which, in some embodiments, may prevent the MEMS sensor (e.g., accelerometer, gyroscope, magnetometer, etc.) from meeting product specifications or providing accurate measurements. For example, a manufacture may impose strict offset limits for MEMS sensors utilized in safety or navigation applications. The strict offset limits are necessary to prevent improper motion or actions.

Figure 2C:
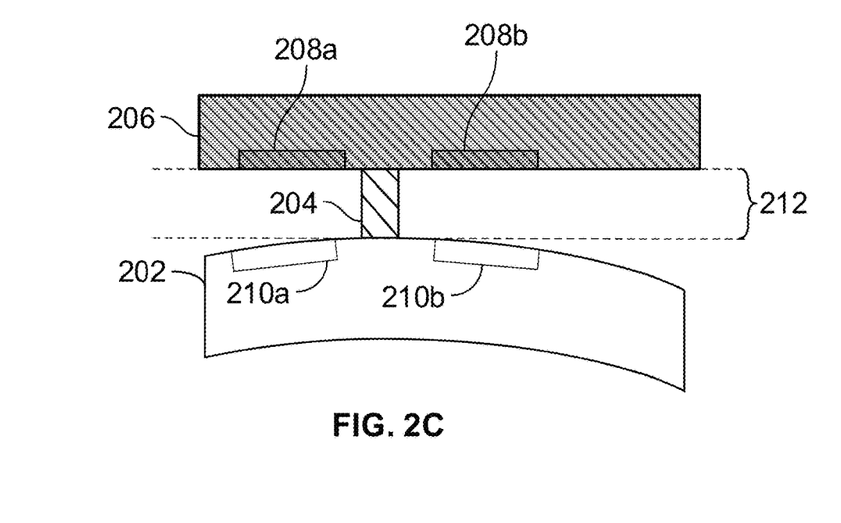
FIG. 2C shows an illustrative MEMS system in response to an external forces, with cancellation of residual linear offset, in accordance with some embodiments of the present disclosure.

FIG. 2C shows an illustrative MEMS system in response to an external stress, with cancellation of residual linear offset, in accordance with some embodiments of the present disclosure. In the depicted embodiment, the system depicted in FIG. 2C includes base substrate 202, anchor 204, proof mass 206, and sense electrodes 208a, 208b, 210a, and 210b of FIG. 2A. A cover substrate is not depicted, but in an embodiment, may also be rigidly coupled to the to a portion of a suspended spring-mass system including a proof mass 206.

In the system depicted in FIG. 2C, while base substrate 202 experiences package deformation (e.g., curves away from proof mass 206) in response to an undesired force (e.g., bending, tilting, etc.), however, anchor 204 and proof mass 206 are configured in such a way that rejects the undesired force, resulting in proof mass 206 exhibiting no deformation or tilting and remaining stationary with respect to the base substrate 202. Consequently, the proof mass electrodes 208a, 208b maintain a relatively common relative position with respect to the base substrate electrodes 210a, 210b (e.g., common z-axis separation and x-y plane overlap) and thus generate a consistent capacitance with respect to each other, which results in no residual linear offset 212 (e.g., no MEMS sensor output without an input stimulus from a force of interest). In some embodiments, the consistent capacitance generated between sense electrodes 208a/210a and 208b/210b of the MEMS sensor (e.g., accelerometer, gyroscope, magnetometer, etc.) of the system depicted in FIG. 2C may allow for the MEMS sensor to meet product specifications that are strict on offset under different test conditions.

Figure 3A:
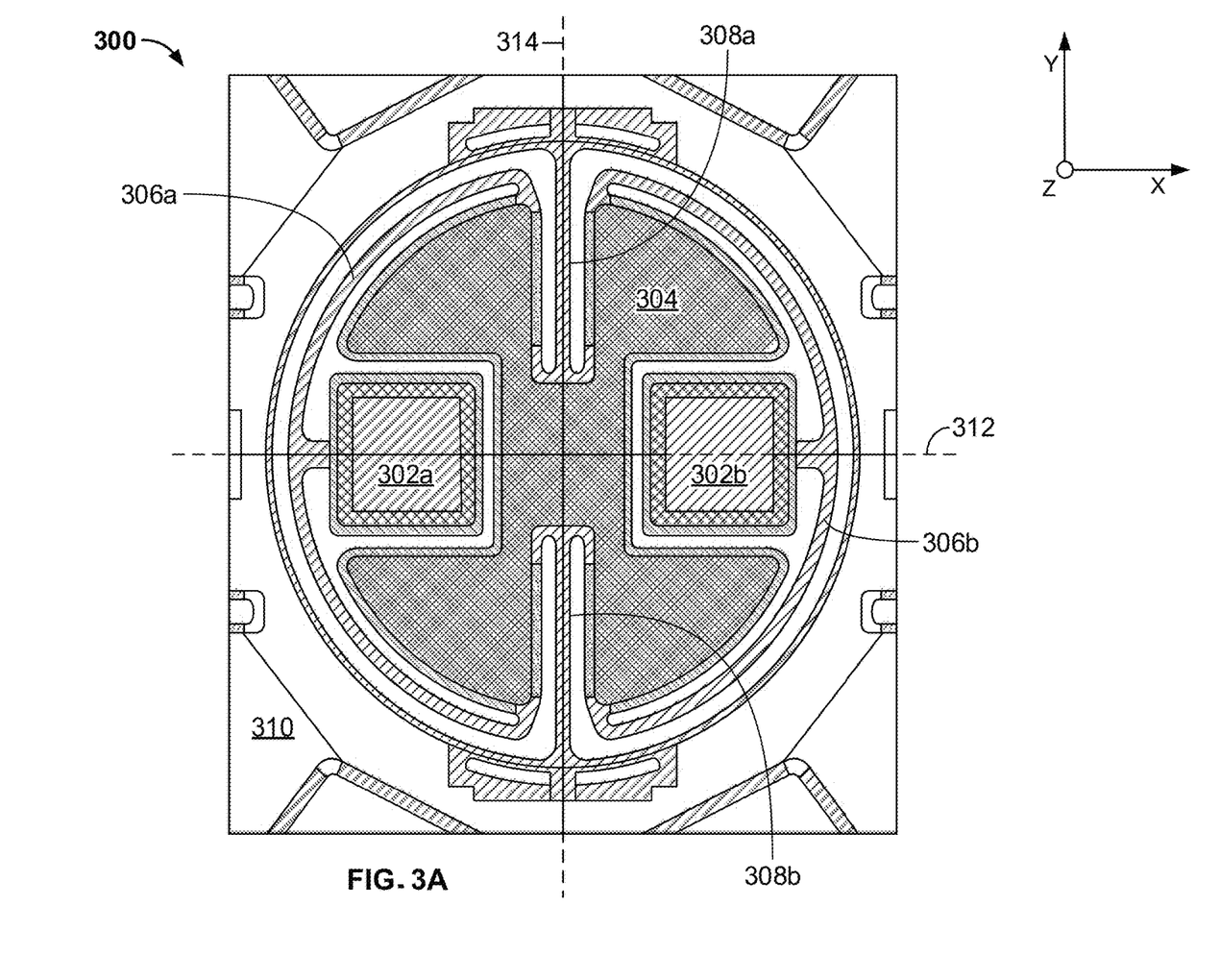
FIG. 3A shows an illustrative anchor system, in accordance with an embodiment of the present disclosure.

FIG. 3A shows an illustrative anchor system, in accordance with an embodiment of the present disclosure. In the depicted embodiment, anchor system 300, located in a MEMS layer of the MEMS sensor, includes first portion 304, second portion 302a, 302b, first spring 306a, 306b, second spring 308a, 308b, and third portion 310. It will be understood that the MEMS sensor may be any suitable sensor (e.g., an accelerometer, a gyroscope, a magnetometer, a barometer, etc.). In some embodiments, system 300 may include any suitable number and types of anchors and springs in any suitable orientation. For example, anchor system 300's second portion may include four electrical anchors as opposed to two, as depicted by FIG. 3A. Although particular components are depicted in certain configurations for system 300, it will be understood that components may be removed, modified, or substituted and that additional components (e.g., springs, electrodes, anchors, processing circuitry, etc.) may be added in certain embodiments.

Second portion 302a/302b includes mechanical anchors that couple (e.g., by anchoring) the second portion 302a/302b to a cover substrate and a base substrate (corresponding to base substrate 202 of FIG. 2A, FIG. 2B, and FIG. 2C), where the anchors are square-shaped portions located opposite of each other within a first (e.g., interior) anchoring region. In some embodiments, the anchors of second portion 302a/302b may be circular or any other suitable shape. Second portion 302a/302b rigidly couples to both the cover (e.g., upper) substrate and the base (e.g., lower) substrate and is electrically connected, via the anchors, to the base substrate. It will be understood that second portion 302a/302b may include any suitable number of electrical anchors in any suitable orientation and shape. Second portion 302a/302b couples to first portion 304 (e.g., a mechanical anchor) via first springs 306a and 306b (e.g., isolation springs) and is isolated from third portion 310 (e.g., a movable proof mass), only being coupled thereto indirectly via the first portion 304 and associated springs. First portion 304 includes a mechanical anchor that rigidly couples (e.g., by mechanically anchoring) to the cover (e.g., upper) substrate and electrically connects to the second portion 302a/302b via first (e.g., isolation) springs 306a, 306b. Within the MEMS layer, first portion 304 "floats" above the base (e.g., lower) substrate and shifts or deforms based on the movement of the cover substrate (e.g., in response to forces applied to the cover substrate). The first portion 304 can be any suitable shape, such as a four-extension floral pattern depicted in FIG. 3A.

The first portion 304 does not electrically anchor to either the cover substrate or the base substrate of the MEMS sensor, and is not rigidly coupled to the base substrate. The square-shaped electrical anchors of second portion 302a, 302b are located within openings of the floral pattern of first portion 304 along x-axis symmetry line 312. It will be understood that first portion 304 may include a variety of first and second portions in a variety of orientations and shapes. In the embodiment depicted in FIG. 3A, first portion 304 (e.g., the mechanical anchor) couples to second portion 302a, 302b (e.g., the electrical anchors) via first spring 306a, 306b (e.g., isolation springs) and couples to third portion 310 (e.g., the movable proof mass) via a second spring 308a, 308b (e.g., compliant springs). First spring 306a, 306b (e.g., isolation springs) isolates the first portion 304 from the second portion 302a, 302b such that movements imparted on the second portion 302a, 302b by the dual anchoring to both the base substrate and cover substrate (e.g., shear forces, compressive forces, etc.) are not imparted on the first portion 304, which moves in unison with the cover substrate relative to the base substrate, preventing tilting and other undesirable movements by the first portion 304.

As depicted by FIG. 3A, the first portion 304 (e.g., the mechanical anchor) and the second portion 302a, 302b (e.g., the dual anchors with electrical connection) form a circular region (e.g., the anchoring region), where the third portion 310 (e.g., the movable proof mass) substantially surrounds the circular anchoring region. It will be understood that the first portion 304 and the second portion 302a, 302b may form a region of any suitable shape (e.g., an elliptical region). First spring 306a, 306b, which includes isolation springs that connect the first portion 304 (e.g., the mechanical anchor) to the second portion 302a, 302b (e.g., the electrical anchors), is located between the circular region (e.g., the first anchoring region), formed by the first portion 304 and the second portion 302a, 302b, and the third portion 310 (e.g., including the movable proof mass).

Second spring 308a, 308b, which includes compliant springs (e.g., compliant to movement about the y-axis) that connect the first portion 304 (e.g., the mechanical anchor) to the third portion 310 (e.g., the movable proof mass), extends through an opening along y-axis symmetry line 314. The first springs 306a, 306b allow the third portion 310 (e.g., proof mass) to remain within the original MEMS plane despite the second anchoring region moving within the MEMS plane. Second spring 308a, 308b (e.g., compliant springs) provides shock absorption for forces applied to the sensor. The compliant spring prevents any such forces to from being applied to the proof mass in a manner that exceeds a threshold for the proof mass (e.g., corresponding to the Young's modulus of the material of the proof mass, thus preventing physical damage to the proof mass)

Third portion 310 includes a movable proof mass that moves in a direction perpendicular to the MEMS layer (e.g., the z-direction) in response to an expected excitation (e.g., a linear acceleration, a Coriolis force, etc.) applied to the MEMS sensor. Third portion 310 (e.g., the movable proof mass) couples to the first portion 304 (e.g., the mechanical anchor) via second spring 308a, 308b (e.g., the compliant springs) and floats with the movement of the cover layer based on corresponding movements of the second anchoring region 304. This allows the third portion to move in a similar manner to the base (e.g., lower) substrate (e.g., including sense electrodes) such that the position of the third portion 310 remains consistent with respect to the base substrate despite the presence of undesired forces. Accordingly, based on capacitive engagement by respective sense electrodes attached to third portion 310 and the base substrate (not visible), a base capacitance is generated with a significantly reduced offset than if the third portion did not move similar to the base substrate.

The sense elements (e.g., sense electrodes on the base substrate) may electrically route via the base substrate to connect to processing circuitry. In some embodiments, the MEMS sensor may include an accelerometer and the expected excitation may include a linear acceleration in a direction perpendicular to the MEMS layer. In some embodiments, the MEMS sensor may include a gyroscope and the expected excitation may include a Coriolis force in a direction perpendicular to the MEMS layer.

A first half of the anchoring region is located on one side of a y-axis symmetry line 314 and is symmetric with a second half of the anchor system 300 located on an opposite side of the y-axis symmetry line 314. For example, second portion 302a is symmetric with second portion 302b, a first half of first portion 304 is symmetric with a second half of first portion 304, first spring 306a is symmetric with first spring 306b, and second spring 308a is symmetric with second spring 308b across y-axis symmetry line 314. A first half of the anchoring region is located on one side of an x-axis symmetry line 312 and is symmetric with a second half of the anchor system 300 located on an opposite side of the x-axis symmetry line 312. For example, second portion 302a, 302b is respectively symmetric, a first half of first portion 304 is symmetric with a second half of first portion 304, first spring 306a, 306b is respectively symmetric, and second spring 308a, 308b is respectively symmetric across x-axis symmetry line 312.

Figure 3B:
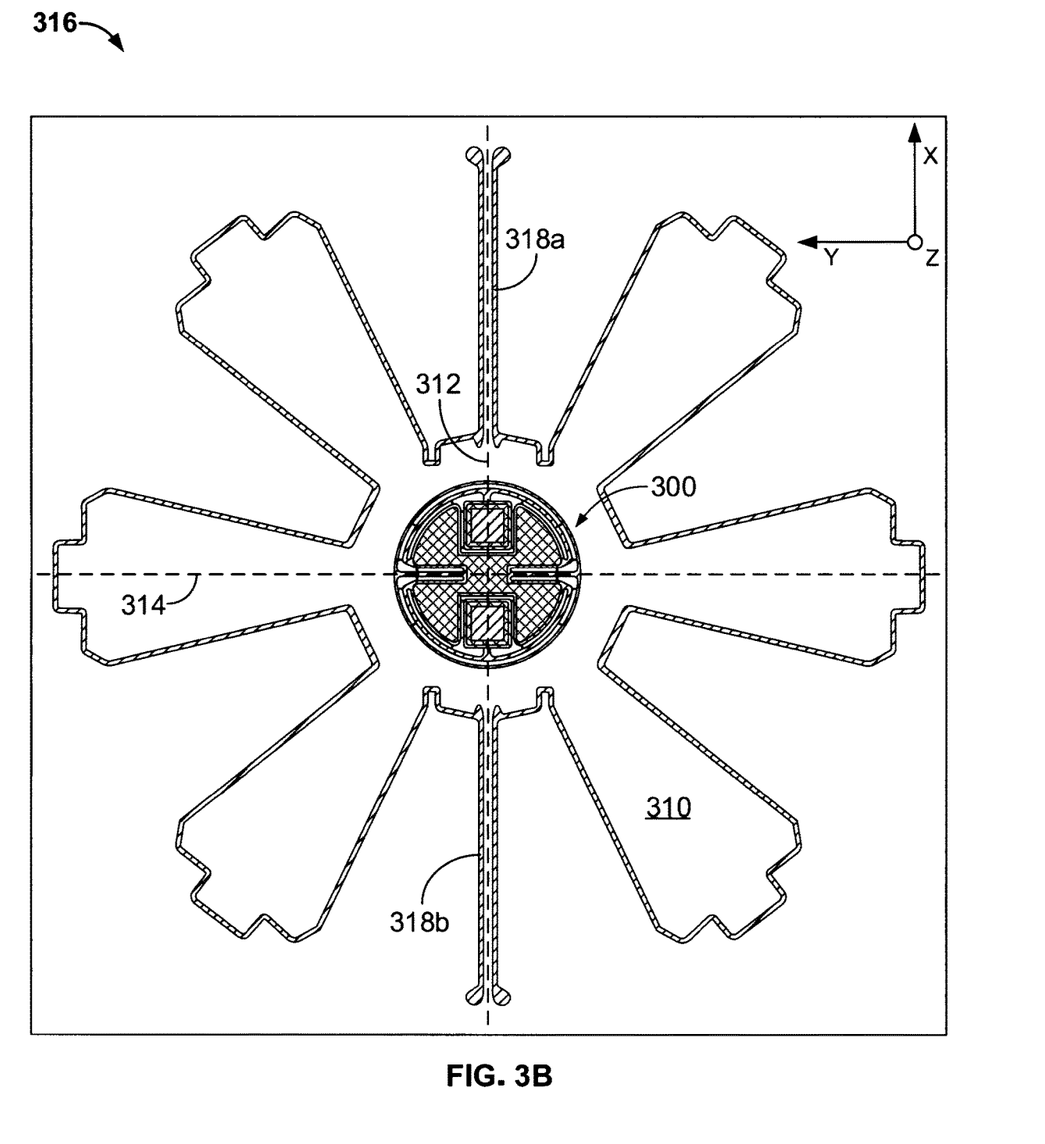
FIG. 3B shows the illustrative anchor system of FIG. 3A implemented in an exemplary MEMS accelerometer, in accordance with an embodiment of the present disclosure.

FIG. 3B shows the illustrative anchor system of FIG. 3A implemented in an exemplary MEMS accelerometer, in accordance with an embodiment of the present disclosure. In the depicted embodiment, MEMS accelerometer 316 includes anchor system 300, proof mass 310, y-axis symmetry line 314, and x-axis symmetry line 312 of FIG. 3A as well as sense springs 318a, 318b. It will be understood that the MEMS accelerometer 316 may, in some embodiments, be any suitable sensor (e.g., gyroscope, magnetometer, barometer, etc.) and accordingly receive any suitable expected excitation (e.g., a Coriolis force, a magnetic force, audio vibrations, etc.). Although particular components are depicted in certain configurations for MEMS accelerometer 316, it will be understood that components may be removed, modified, or substituted and that additional components (e.g., springs, processing circuitry, etc.) may be added in certain embodiments.

Anchor system 300 is positioned in the center of proof mass 310 and the center of MEMS accelerometer 316 such that the center of anchor system 300 aligns with the center of proof mass 310 and the center of MEMS accelerometer 316. Sense springs 318a, 318b are aligned perpendicular to the second springs (e.g., compliant springs) of anchor system 300. In response to a linear acceleration in the z-axis direction, the proof mass 310 rotates about the sense springs out of the MEMS plane, with one portion of the proof mass (e.g., on one side of x-axis symmetry line 314) moving towards the base substrate electrodes and the other portion of the proof mass (e.g., on the other side of x-axis symmetry line 314) moving away from the base substrate electrodes.

In the instance of an undesired force such as a shear force, the proof mass 310 may move (e.g., shift, deform, etc.) with the cover substrate layer based on its connection to the first portion via the compliant springs, as described with respect to FIG. 3A. In this manner, the proof mass 310 may maintain a consistent displacement (e.g., z-axis separation and x-y plane overlap) with the base substrate (e.g., including sense electrodes) to maintain a base capacitance with minimal offset (e.g., an output signal without input stimulus) despite the presence of the undesired force.

Figure 4:
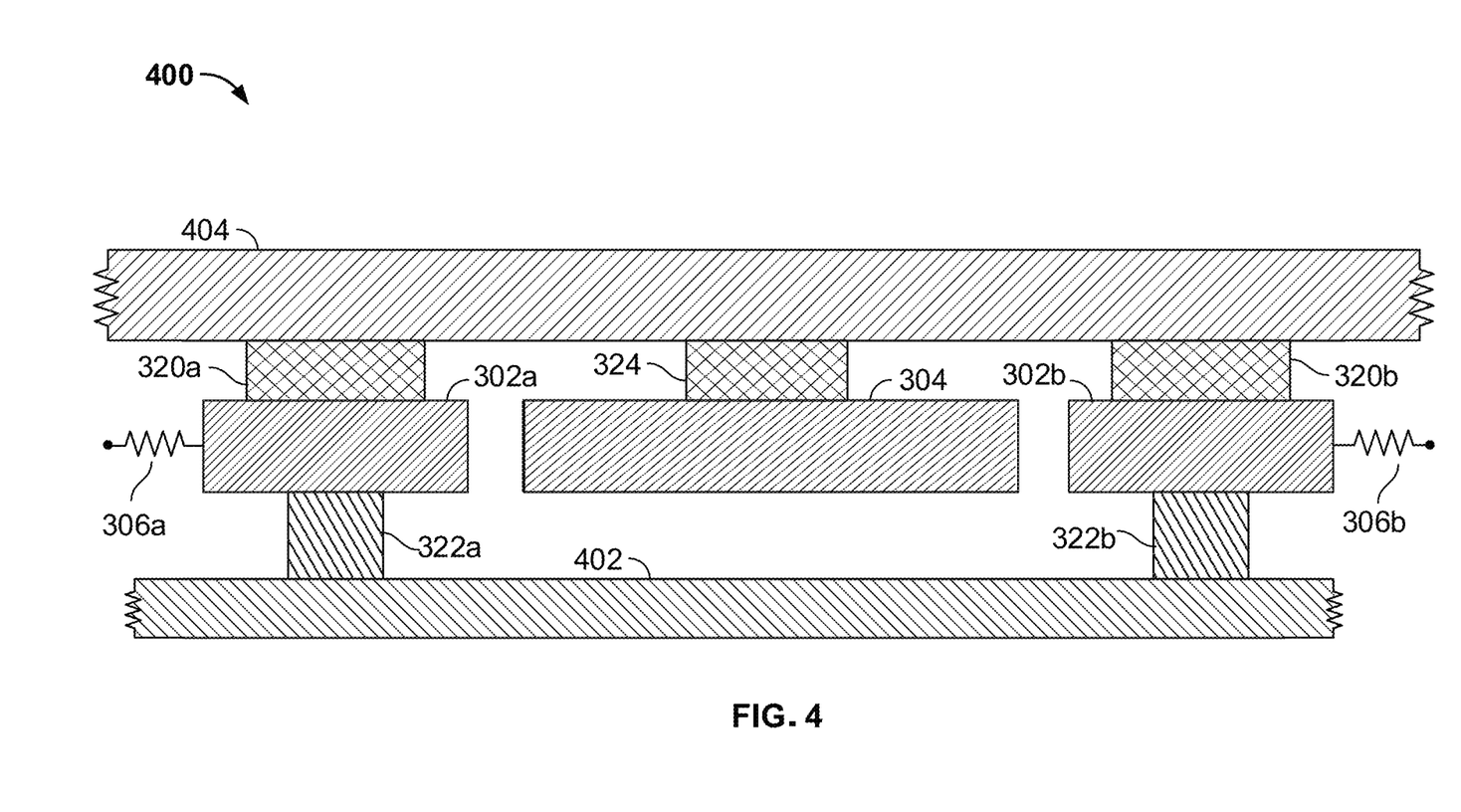
FIG. 4 shows a section view of the illustrative anchor system of FIG. 3A along a first axis, in accordance with an embodiment of the present disclosure.

FIG. 4 shows a sectional view of an illustrative anchor system, in accordance with an embodiment of the present disclosure, along x-axis symmetry line 312 of FIGS. 3A and 3B. In the depicted embodiment, the anchoring system located in a MEMS layer of the MEMS sensor, includes second portion 302a, 302b, first portion 304, and first spring 306a, 306b of FIG. 3A. Additionally, anchor system 400 includes base substrate 402 (e.g., a CMOS substrate) of FIG. 2A as well as cover substrate 404. In some embodiments, the system of FIG. 4 may include any suitable number and types of anchors and springs in any suitable orientation. Although particular components are depicted in certain configurations, it will be understood that components may be removed, modified, or substituted and that additional components (e.g., springs, electrodes, anchors, processing circuitry, etc.) may be added in certain embodiments.

Cover substrate 404 connects to first portion 304 via anchor 324 and to second portion 302a and 302b by anchors 320a and 320b, where the second portion 302a and 302b also connects to base substrate 402 (e.g., the CMOS substrate) via anchors 322a and 322b. While the first portion 304 only mechanically anchors to cover substrate 404, the second portion mechanically anchors to both the cover substrate 404 and the base substrate 402 and, in addition, electrically anchors to one or both of the cover substrate 404 and the base substrate 402 (e.g., to processing circuitry within base substrate 402).

As depicted by FIG. 4, first springs 306a and 306b (e.g., isolation springs) extend from the second portions 302a and 302b. Not depicted in the section FIG. 4 is the further extension of the first springs 302a and 302b within the x-y plane to connect to other (not depicted) portions of the first portion 304. The first springs 306a and 306b isolate the first portion 304, and indirectly a third portion (e.g., a movable proof mass that is not visible in FIG. 4), from any movement of the second portions 302a and 302b due to undesired forces. The isolation from the undesired force allows the third portion (e.g., the movable proof mass that's not visible in FIG. 4), which couples to the first portion via a second spring (e.g., compliant springs that are not visible in FIG. 4), to maintain its form and a consistent displacement with base substrate 402 (e.g., including sense electrodes). In some embodiments, an undesired force (e.g., a shear force), may invoke the base substrate 402 (e.g., the CMOS substrate) to move or deform. The second portion 302a, 302b (e.g., the electrical anchors), which rigidly couples to both the base and the cover substrate, may tilt in accordance with the deformation of the base substrate and a corresponding movement of the cover substrate 404.

As described earlier, first spring 306a, 306b directly isolates the first portion 304, and indirectly isolates a third portion (e.g., a movable proof mass that's not visible in FIG. 4) from the tilt, shift, or deformation of second portion 302a, 302b in response to the undesired force applied to the MEMS sensor, which allows the third portion to maintain its form and displacement with respect to the base substrate 402 (e.g., including sense electrodes). Based on the first spring 306a, 306b (e.g., isolation springs) and the fact that the first portion 304 "floats" with respect to the base substrate 402 and shifts based on movement of the cover substrate 404, such undesired forces are only translated to the first portion 304 in a manner similar to the movement of the base substrate 202. Accordingly, the third portion (e.g., the movable proof mass), which couples to first portion 304 via a second spring (e.g., compliant springs that are not visible in FIG. 4), moves in a similar manner with respect to base substrate 402 (e.g., including sense electrodes) such that the position of the third portion with respect to base substrate 202 remains consistent despite the presence of undesired forces. In some embodiments, a first pair of sense electrodes may be integral to the third portion (e.g., the movable proof mass that's not visible in FIG. 4), and a second pair of sense electrodes may be attached to the top surface of base substrate 202 (e.g., the CMOS substrate) opposite the first pair of sense electrodes. The first and second pair of sense electrodes capacitively engage with each other depending on z-axis separation and x-y plane overlap. In some embodiments, the sense electrodes are electrically routed through base substrate 202 to processing circuitry (e.g., an ASIC, a FPGA, etc.). Due to the movement (e.g., tilt, shift, deformation, etc.) of the second portion 302a, 302b (e.g., the electrical anchors), in response to the undesired force, and the presence of the first spring 306a, 306b (e.g., isolation springs), the third portion (e.g., the movable proof mass that's not visible in FIG. 4) maintains its form and moves in a similar manner (e.g., maintains a consistent displacement) with base substrate 202 (e.g., including sense electrodes), which generates a common capacitance between the first pair and the second pair of sense electrodes, substantially eliminating offset (e.g., sensor output when there is no input stimulus) produced by the MEMS sensor. The MEMS sensor outputs the proper capacitance, based on the capacitive engagement of the first and second pairs of sense electrodes (e.g., differential pairs of positive and negative electrodes), as a sense signal via processing circuitry that may be routed through base substrate 402.

Figure 5:
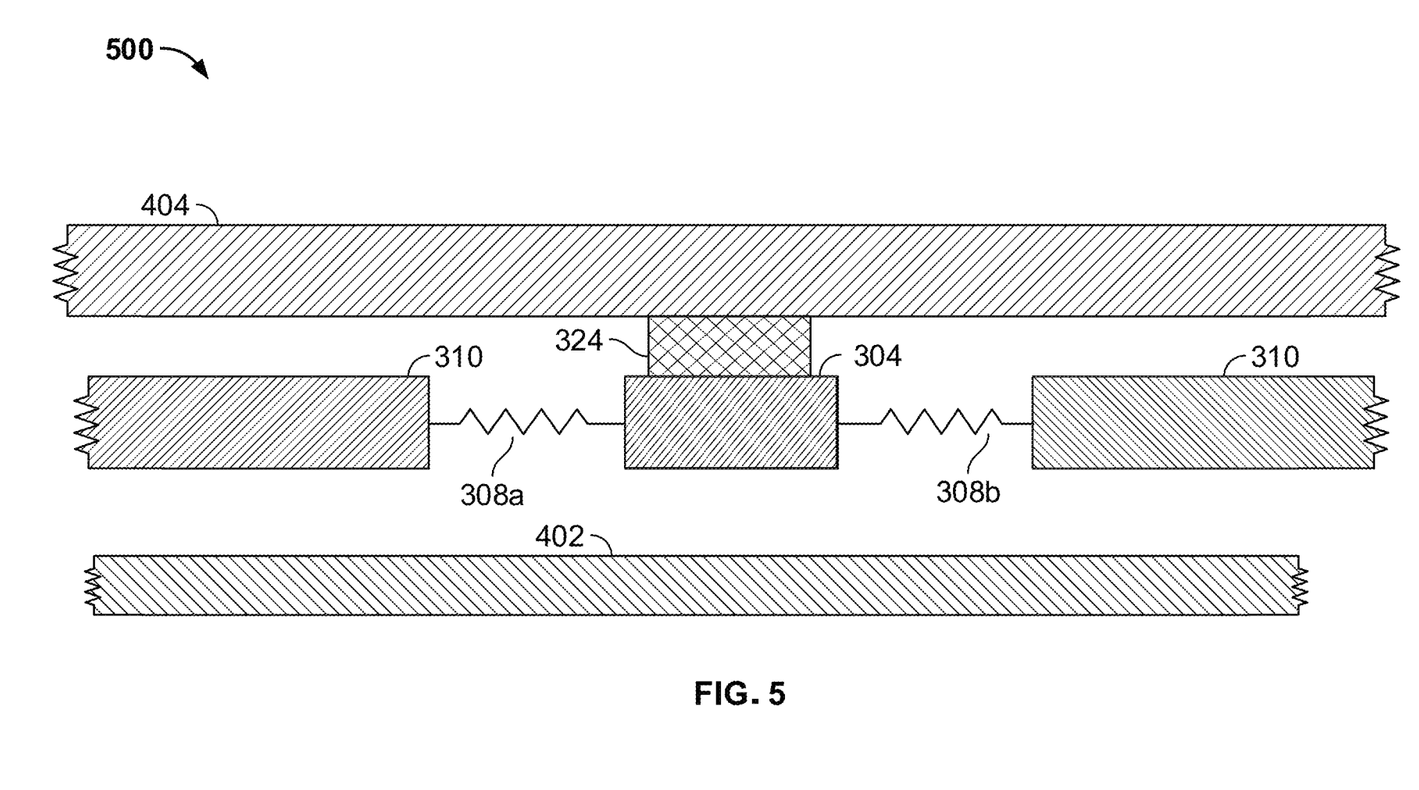
FIG. 5 shows a section view of the illustrative anchor system of FIG. 3A along a second axis, in accordance with an embodiment of the present disclosure.

FIG. 5 shows a sectional view of an illustrative isolation mechanism within an anchor system along the y-axis symmetry line 314, in accordance with an embodiment of the present disclosure. In the depicted embodiment, the anchor system of FIG. 5, located in a MEMS layer of the MEMS sensor, includes first portion 304 connected to the cover substrate 404, second spring 308a, 308b (e.g., compliant springs), and third portion 310 (e.g., a movable proof mass) of FIG. 3A. It will be understood that the MEMS sensor may be any suitable sensor (e.g., an accelerometer, a gyroscope, a magnetometer, a barometer, etc.). Additionally, FIG. 5 further depicts base substrate 402 as well as cover substrate 404. The anchor system of FIG. 5 may include any suitable number and types of anchors and springs in any suitable orientation. Although particular components are depicted in certain configuration, it will be understood that components may be removed, modified, or substituted and that additional components (e.g., springs, electrodes, anchors, processing circuitry, etc.) may be added in certain embodiments.

Third portion 310 (e.g., the movable proof mass) couples to first portion 304 via second springs 308a and 308b (e.g., compliant springs), which provides shock absorption (e.g., stress relief) for third portion 310 in response to an undesired force (e.g., a shear force) applied to the MEMS sensor. First portion 304 (e.g., the mechanical anchor) couples to a second portion (e.g., an electrical anchor that's not visible in FIG. 5) via a first spring (e.g., isolation springs that aren't visible in FIG. 5), which isolates the first portion 304, and indirectly isolates third portion 310 (e.g., the movable proof mass), from any movement by the second portion in response to an undesired force (e.g., a shear force). The isolation from the undesired force allows third portion 310 to maintain its relative position and move in a similar manner (e.g., maintain a consistent displacement) with base substrate 402. For example, an undesired force (e.g., a shear force) may cause base substrate 402 (e.g., the CMOS substrate) to shift within the x-y plane, in which case third portion 310 may move similarly to base substrate 402 and shift in the same manner to preserve consistent z-axis separation and x-y plane overlap between the two components and reduce offset (e.g., sensor output when there is no input stimulus) generated by the MEMS sensor. Based on the first spring (e.g., isolation springs that aren't visible in FIG. 5) and the fact that the first portion 304 (e.g., the mechanical anchor) "floats" with respect to the base substrate 402 (e.g., the CMOS substrate) and shifts based on movement of the cover substrate 404, undesired forces that are translated to the first portion 304 do not result in a corresponding change in position between the proof mass 310 and sense electrodes of base substrate 402. Accordingly, the third portion 310 (e.g., the movable proof mass), which couples to the first portion 304 (e.g., the mechanical anchor) via the second spring 308a, 308b (e.g., compliant springs), moves in a similar manner to base substrate 402 (e.g., including sense electrodes) such that the position of the third portion 310 with respect to base substrate 202 remains consistent despite the presence of undesired forces.

Figure 6:
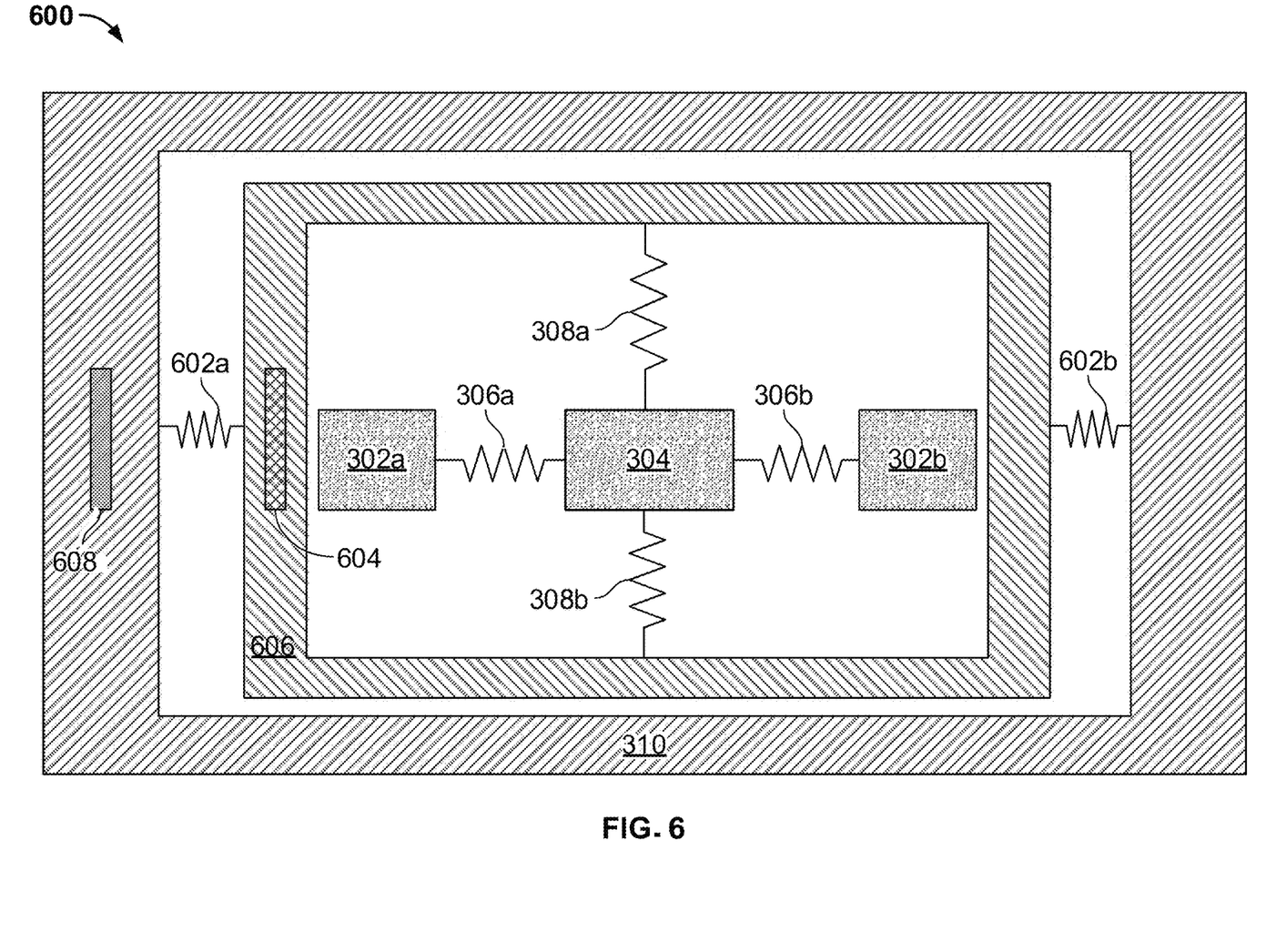
FIG. 6 shows a simplified representation of an illustrative anchor system, in accordance with an embodiment of the present disclosure.

FIG. 6 shows a simplified representation of an illustrative anchor system, in accordance with an embodiment of the present disclosure. In the depicted embodiment, an anchoring system includes second portion 302a, 302b (e.g., the electrical anchors), first portion 304 (e.g., the mechanical anchor), first spring 306a, 306b (e.g., isolation springs), second spring 308a, 308b (e.g., compliant springs), and third portion 310 (e.g., the movable proof mass), similar to FIG. 3A. The anchoring system also includes paddle 606 and a paddle sense element 604. It will be understood that the MEMS sensor may be any suitable sensor (e.g., an accelerometer, a gyroscope, a magnetometer, a barometer, etc.) and may receive any suitable expected excitation (e.g., a linear acceleration, a Coriolis force, a magnetic force, audio vibrations, etc.). Attached to the anchor system are a proof mass 310, which is attached to paddle 606 via sense springs 602a and 602b. In some embodiments, anchor system 600 may include any suitable number and types of anchors, springs, paddles, proof masses and other sensor components in any suitable orientation. Although particular components are depicted in certain configurations for anchor system 600, it will be understood that components may be removed, modified, or substituted and that additional components (e.g., springs, electrodes, anchors, processing circuitry, etc.) may be added in certain embodiments.

Second spring 308a, 308b (e.g., compliant springs), which couples first portion 304 (e.g., the mechanical anchor) to paddle 606, is orthogonal with respect to sense springs 602a, 602b. It will be understood that there may be any suitable number of second springs 308a, 308b (e.g., compliant springs) in anchor system 600 to absorb shock (e.g., relieve stress) to prevent paddle 606 from responding to an undesired force (e.g., a shear force) applied to the MEMS sensor. To the extent that paddle 606 experiences such a force that causes movement with respect to base substrate (e.g. a change in z-axis distance and/or x-y plane overlap) sense electrode 604 may sense that movement, allowing for compensation to be performed based on known relationships of the movement of paddle 606 and proof mass 310. First spring 306a, 306b, which couples first portion 304 to second portion 302a, 302b, directly isolates the first portion 304, and indirectly isolates paddle 606 (e.g., via compliant springs 308a, 308b), from any movement by the second portion 302a, 302b in response to an undesired force (e.g., a shear force). Sense springs 602a, 602b connect paddle 606 to third portion 310 (e.g., the movable proof mass) and allow movement of the third portion 310 in response to a force of interest (e.g., a z-axis linear velocity).

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) sensor, comprising:
   a base substrate;
   a cover substrate; and
   a suspended spring-mass system located in a MEMS layer, comprising:
      a first portion, wherein the first portion is coupled to the cover substrate;
      a second portion, wherein the second portion is coupled to the cover substrate and the base substrate;
      a third portion comprising a proof mass configured to move in a first direction in response to an external force;
      a first spring connecting the first portion to the second portion;
      a second spring connecting the first portion to the third portion; and
      a sensing element configured to output a sense signal in response to the motion of the third portion in the first direction, wherein the first, second, and third portions move in response to a shear force applied to the MEMS sensor in a second direction, and wherein the sense signal generated by the sensing element in response to a movement of the proof mass in the first direction remains unchanged when the shear force causes the movement in the second direction.

2. The MEMS sensor of claim 1, wherein a shock load applied to the MEMS sensor causes a motion of the first, second, and third portions, and wherein the second spring provides stress relief between the first and third portions.

3. The MEMS sensor of claim 1, wherein, in response to an external shear force applied between the base and the cover substrate, the first portion remains flat, the second portion moves, and the first spring minimizes the external shear force applied to the first portion from the motion of the second portion, and wherein the first spring indirectly isolates the third portion from the motion of the second portion.

4. The MEMS sensor of claim 1, wherein the first portion is rigidly coupled to the cover substrate, and wherein the second portion is rigidly coupled to the cover substrate and the base substrate.

5. The MEMS sensor of claim 4, wherein the first portion is electrically coupled to the second portion via the first spring, and wherein the second portion is electrically coupled to the base substrate.

6. The MEMS sensor of claim 1, wherein the proof mass moves in the first direction in response to the external force, wherein the first direction is perpendicular to the MEMS layer, and wherein the external force comprises a linear acceleration.

7. The MEMS sensor of claim 1, wherein the MEMS sensor comprises an accelerometer, a gyroscope, a barometer, or a magnetometer and the external force comprises a linear acceleration, a Coriolis force, audio vibrations, or a magnetic force in the direction perpendicular to the MEMS layer.

8. The MEMS sensor of claim 1, wherein the first portion and the second portion are symmetric about a first symmetry axis.

9. The MEMS sensor of claim 8, wherein the first portion and the second portion are symmetric about a second symmetry axis.

10. The MEMS sensor of claim 9, wherein the second symmetry axis is perpendicular to the first symmetry axis.

11. The MEMS sensor of claim 1, wherein the third portion substantially surrounds the first portion and the second portion.

12. The MEMS sensor of claim 1, wherein the first portion comprises a four-extension floral pattern with respective opening pairs, wherein at least one opening pair includes the second portion, and wherein at least another opening pair includes the second spring.

13. The MEMS sensor of claim 1, wherein a first half of the suspended spring-mass system is located on one side of a first symmetry line within a circular region and is symmetric with a second half of the suspended spring-mass system located on an opposite side of the first symmetry line within the circular region.

14. The MEMS sensor of claim 13, wherein a first half of the suspended spring-mass system is located on one side of a second symmetry line within the circular region and is symmetric with a second half of the suspended spring-mass system located on an opposite side of the second symmetry line within the circular region.

15. The MEMS sensor of claim 14, wherein the circular region is an elliptical region.

16. The MEMS sensor of claim 1, further comprising a sense spring, wherein the sense spring connects the third portion to the first portion, wherein a first half of the suspended spring-mass system is asymmetric with a second half of the suspended spring-mass system.

17. MEMS sensor of claim 1, wherein, in response to an external shear force applied between the base and the cover substrate, the base substrate moves due to the external shear force and the second portion tilts within the MEMS layer based on a corresponding movement of the cover substrate in response to the external shear force, wherein the first portion maintains its position and the third portion remains within the MEMS layer and aligned with one or more electrodes of the base substrate in response to the external shear force, and wherein the one or more electrodes of the base substrate forms a moving capacitor with the third portion.

18. The MEMS sensor of claim 1, wherein the shear force applied to the sensor will cause the third portion to deform in a similar manner to the base substrate in the second direction to retain spacing with respect to the base substrate.

19. The MEMS sensor of claim 1, wherein the shear force applied in the second direction to the sensor will cause a relative motion between the third portion and the base substrate to be negligible.

20. The MEMS sensor of claim 1, wherein a plurality of sense springs align with a portion of the first spring along a first symmetry line.

21. The MEMS sensor of claim 1, wherein the sense signal is electrically routed through the base substrate.

22. The MEMS sensor of claim 1, wherein the center of the sense element and the center of the first portion is the same point.

23. A microelectromechanical system (MEMS) sensor, comprising:
- a base substrate;
- a cover substrate; and
- an anchoring region, comprising:
  - a first portion, wherein the first portion is rigidly coupled to the cover substrate;
  - a second portion, wherein the second portion is rigidly coupled to the cover substrate and the base substrate;
  - a first spring connecting the first portion to the second portion; and
  - a second spring;
- a proof mass region substantially surrounding the anchoring region and connected to the first portion via the second spring.

24. The MEMS sensor of claim 23, wherein a shock load applied to the MEMS sensor causes a motion of the first portion, the second portion, and the proof mass, and wherein the second spring provides stress relief between the first portion and the proof mass.

25. The MEMS sensor of claim 23, wherein, in response to an external shear force applied between the base and the cover substrate, the first portion remains flat, the second portion moves, and the first spring minimizes the external shear force applied to the first portion from the motion of the second portion, and wherein the first spring indirectly isolates the proof mass from the motion of the second portion.

26. The MEMS sensor of claim 23, wherein, in response to an external shear force applied between the base substrate and the cover substrate, the base substrate moves due to the external shear force and the second portion tilts based on a corresponding movement of the cover substrate in response to the external shear force, wherein the first portion maintains its position and the proof mass remains aligned with one or more electrodes of the base substrate in response to the external shear force, and wherein the one or more electrodes of the base substrate forms a moving capacitor with the proof mass.

27. A microelectromechanical system (MEMS) sensor, comprising:
- a base substrate;
- a cover substrate; and
- an anchoring region within a MEMS layer, the anchoring region comprising:
  - a first portion, wherein the first portion is rigidly coupled to the cover substrate;
  - a second portion, wherein the second portion is rigidly coupled to the cover substrate and the base substrate;
  - a first spring connecting at one end to the first portion and at another end to the second portion; and
  - a second spring connecting the first portion to a proof mass.

28. The MEMS sensor of claim 27, wherein a shock load applied to the MEMS sensor causes a motion of the first portion, the second portion, and the proof mass, and wherein the second spring provides stress relief between the first portion and the proof mass.

29. The MEMS sensor of claim 27, wherein, in response to an external shear force applied between the base and the cover substrate, the first portion remains flat, the second portion moves, and the first spring minimizes the external shear force applied to the first portion from the motion of the second portion, and wherein the first spring indirectly isolates the proof mass from the motion of the second portion.

30. The MEMS sensor of claim 27, wherein, in response to an external shear force applied between the base substrate and the cover substrate, the base substrate moves due to the external shear force and the second portion tilts based on a corresponding movement of the cover substrate in response to the external shear force, wherein the first portion maintains its position and the proof mass remains aligned with one or more electrodes of the base substrate in response to the external shear force, and wherein the one or more electrodes of the base substrate forms a moving capacitor with the proof mass.

* * * * *